(12) United States Patent
Laskey et al.

(10) Patent No.: US 9,638,240 B2
(45) Date of Patent: May 2, 2017

(54) HYDROFORMED DRIVESHAFT TUBE WITH SECONDARY SHAPE

(71) Applicant: DANA AUTOMOTIVE SYSTEMS GROUP, LLC, Maumee, OH (US)

(72) Inventors: Ryan W. Laskey, Lambertville, MI (US); Jeffrey A. Dutkiewicz, Toledo, OH (US)

(73) Assignee: Dana Automotive Systems Group, LLC, Maumee, OH (US)

( * ) Notice: Subject to any disclaimer, the term of this patent is extended or adjusted under 35 U.S.C. 154(b) by 0 days.

(21) Appl. No.: 14/749,230

(22) Filed: Jun. 24, 2015

(65) Prior Publication Data

US 2015/0354623 A1    Dec. 10, 2015

Related U.S. Application Data

(62) Division of application No. 14/075,034, filed on Nov. 8, 2013, now abandoned.

(51) Int. Cl.
*F16C 3/02* (2006.01)
*B21D 26/033* (2011.01)
(Continued)

(52) U.S. Cl.
CPC .............. *F16C 3/02* (2013.01); *B21D 26/033* (2013.01); *B21D 53/84* (2013.01); *F16F 15/322* (2013.01); *Y10T 464/50* (2015.01)

(58) Field of Classification Search
CPC .......... F16C 3/02; F16F 15/322; B21D 53/84; B21D 26/033; Y10T 464/50
(Continued)

(56) References Cited

U.S. PATENT DOCUMENTS

| 1,528,418 A | 3/1925 | Hahnemann et al. |
| 2,254,566 A | 9/1941 | Cornell, Jr. |

(Continued)

FOREIGN PATENT DOCUMENTS

| DE | 576055 C | 5/1933 |
| DE | 19960963 A1 | 7/2001 |

(Continued)

OTHER PUBLICATIONS

International Search Report and Written Opinion for Application No. PCT/US2013/069086, mailing date Feb. 26, 2014.

*Primary Examiner* — Gregory Binda
(74) *Attorney, Agent, or Firm* — Marshall & Melhorn, LLC

(57) ABSTRACT

A hydroformed driveshaft tube formed using a hydroforming process is provided. The hydroformed driveshaft tube comprises a first end portion, a second end portion, and a middle portion. The middle portion is at least partially defined by a circular arc shaped surface of revolution. At least a portion of the middle portion has a diameter greater than a diameter of the first end portion and the second end portion. The middle portion comprises a first transition portion, a first constriction portion, a second constriction portion, and a second transition portion and is formed between the first end portion and the second end portion. The middle portion is formed between the first constriction portion and the second constriction portion and the middle portion affects a critical speed and a breathing mode frequency of the hydroformed driveshaft tube. The hydroformed driveshaft tube reduces a cost of a driveshaft assembly.

6 Claims, 6 Drawing Sheets

(51) Int. Cl.
*B21D 53/84* (2006.01)
*F16F 15/32* (2006.01)

(58) Field of Classification Search
USPC .................. 464/183; 72/370.24, 370.25, 713
See application file for complete search history.

(56) References Cited

U.S. PATENT DOCUMENTS

| | | | |
|---|---|---|---|
| 4,751,835 A | 6/1988 | Galaniuk et al. | |
| 5,239,852 A | 8/1993 | Roper | |
| 5,287,768 A | 2/1994 | Amborn et al. | |
| 5,353,618 A | 10/1994 | Roper et al. | |
| 5,354,237 A * | 10/1994 | Amborn | F16C 3/02 |
| 5,481,892 A | 1/1996 | Roper et al. | |
| 5,499,520 A | 3/1996 | Roper | |
| 5,666,879 A | 9/1997 | Kutscher et al. | |
| 5,802,898 A | 9/1998 | Roper | |
| 5,865,054 A | 2/1999 | Roper | |
| 5,890,387 A | 4/1999 | Roper et al. | |
| 5,918,494 A | 7/1999 | Kojima et al. | |
| 5,979,201 A | 11/1999 | Horton et al. | |
| 6,006,567 A | 12/1999 | Brown et al. | |
| 6,016,603 A | 1/2000 | Marando et al. | |
| 6,105,409 A | 8/2000 | Kojima et al. | |
| 6,164,108 A | 12/2000 | Brown et al. | |
| 6,176,114 B1 | 1/2001 | Gmurowski | |
| 6,254,488 B1 | 7/2001 | Hill | |
| 6,298,701 B1 | 10/2001 | Marando | |
| 6,371,859 B1 | 4/2002 | Gibson | |
| 6,497,030 B1 | 12/2002 | Marando | |
| 6,502,822 B1 | 1/2003 | Brown | |
| 6,536,251 B2 | 3/2003 | Marando et al. | |
| 6,543,266 B1 | 4/2003 | Jaekel | |
| 6,651,327 B1 | 11/2003 | Alder et al. | |
| 6,701,763 B2 | 3/2004 | Varela | |
| 6,732,560 B1 | 5/2004 | Winterhalter et al. | |
| 6,948,225 B2 | 9/2005 | Smith | |
| 6,959,476 B2 | 11/2005 | Li et al. | |
| 7,080,436 B2 | 7/2006 | Durand | |
| 7,080,437 B2 | 7/2006 | da Silva et al. | |
| 7,181,846 B2 | 2/2007 | Wagner et al. | |
| 7,234,223 B2 | 6/2007 | Liu | |
| 7,441,432 B2 | 10/2008 | Ingvarsson | |
| 7,464,572 B2 | 12/2008 | Miyanaga et al. | |
| 7,814,633 B2 | 10/2010 | Slack | |
| 7,992,762 B2 * | 8/2011 | Sato | C21D 1/28 |
| 2005/0126243 A1 | 6/2005 | Lee | |
| 2006/0035714 A1 | 2/2006 | Qu et al. | |
| 2007/0169530 A1 | 7/2007 | Gharib | |
| 2008/0121007 A1 | 5/2008 | Ingvarsson | |
| 2012/0211125 A1* | 8/2012 | Yoshida | F16C 3/02 |

FOREIGN PATENT DOCUMENTS

| | | |
|---|---|---|
| DE | 102005007143 A1 | 5/2006 |
| GB | 2108630 A | 5/1983 |
| GB | 2358902 A | 8/2001 |
| GB | 2371614 A | 7/2002 |
| JP | 2004316721 A | 11/2004 |

* cited by examiner

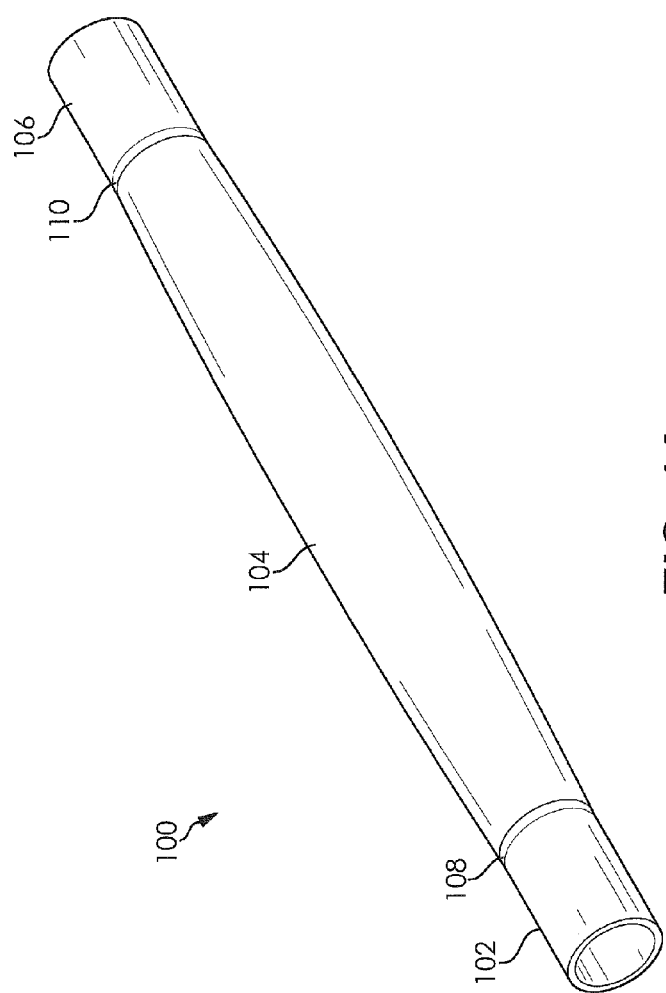
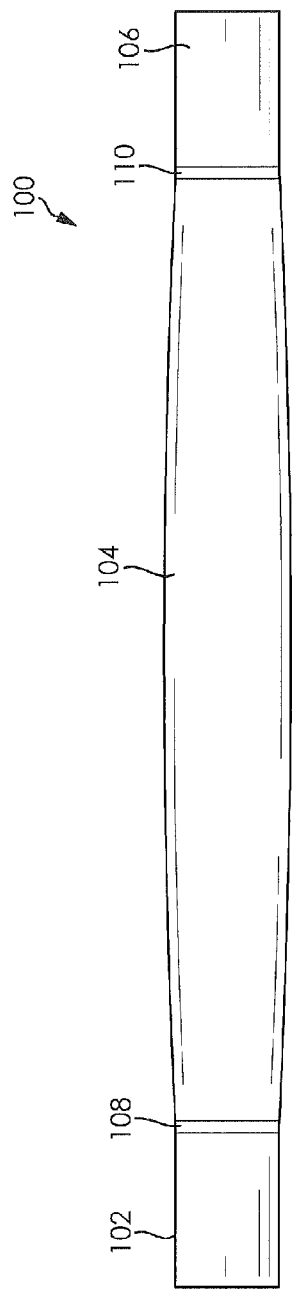

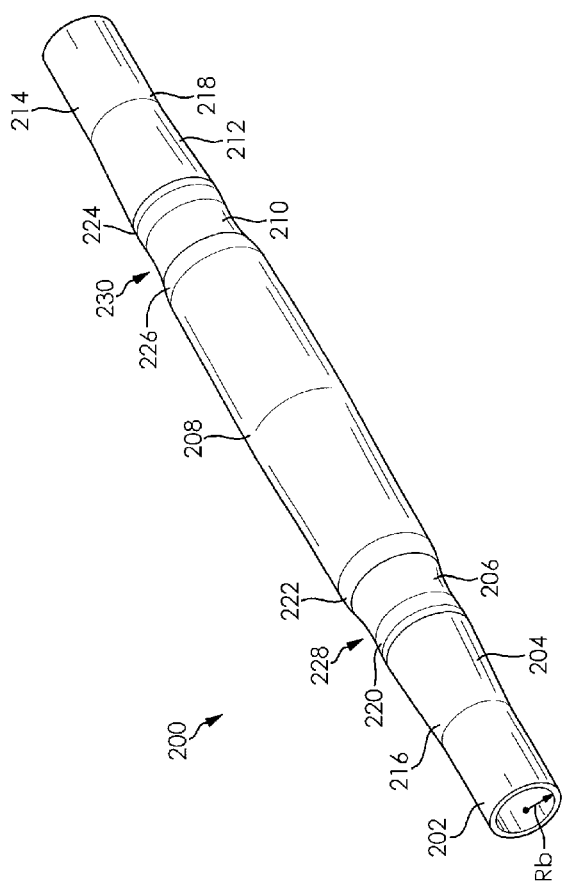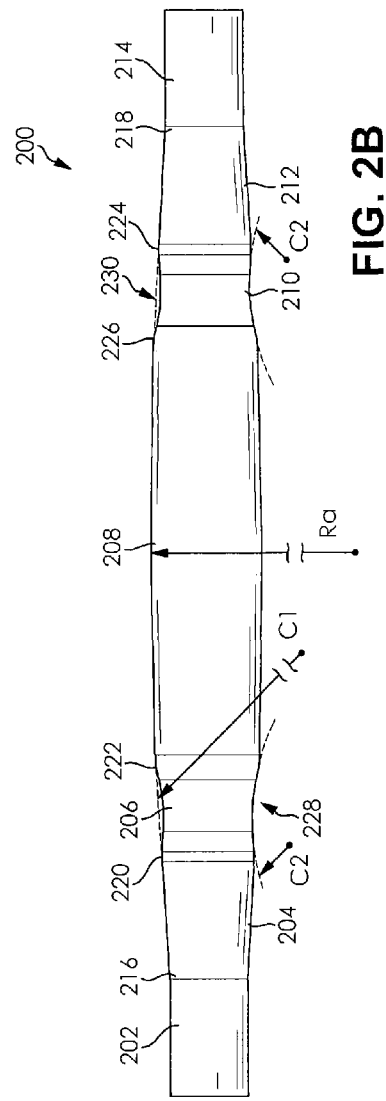

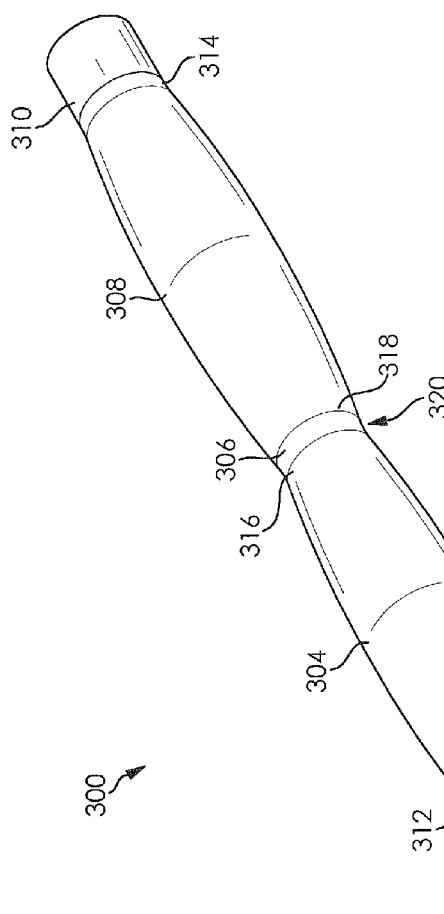
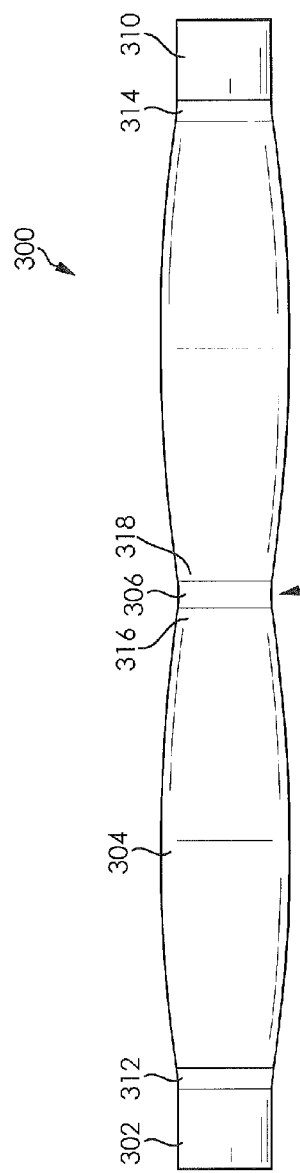
FIG. 3A
FIG. 3B

| | Critical Speed (Hz) | Breathing Mode Frequency (Hz) | Percentage change in Critical Speed Over Straight Tubing (Diameter of end portion 102,106,202,214, 302,310) | Percentage change in Breathing Mode Frequency Over Straight Tubing (Greatest diameter of middle portion 104,208, or distension 304,308) |
|---|---|---|---|---|
| Tubing Length 1 | | | | |
| Straight Tubing (Diameter of end portion 202,214) | 70 | 1380 | Control | N/A |
| Second Driveshaft Tube 200 | 90 | 490 | 28.6% | 51.7% |
| Straight Tubing (Greatest diameter of middle portion 208) | 106 | 323 | N/A | Control |
| Tubing Length 2 | | | | |
| Straight Tubing (Diameter of end portion 102,106,302,310) | 111 | 1083 | Control | N/A |
| Third Driveshaft Tube 300 | 136 | 680 | 22.3% | 105.4% |
| First Driveshaft Tube 100 | 140 | 553 | 25.9% | 67.1% |
| Straight Tubing (Greatest diameter of middle portion 104 or distension 304,308) | 150 | 331 | N/A | Control |
| Tubing Length 3 | | | | |
| Straight Tubing (Diameter of end portion 102,106,302,310) | 63 | 1081 | Control | N/A |
| Third Driveshaft Tube 300 | 75 | 680 | 19.9% | 111.8% |
| First Driveshaft Tube 100 | 77 | 553 | 23.1% | 72.3% |
| Straight Tubing (Greatest diameter of middle portion 104 or distension 304,308) | 85 | 321 | N/A | Control |

FIG. 4

HYDROFORMED DRIVESHAFT TUBE WITH SECONDARY SHAPE

RELATED APPLICATIONS

This application is a divisional application of U.S. application Ser. No. 14/075,034 filed on Nov. 8, 2013, now abandoned, which is incorporated by reference in its entirety. The present application is being filed during the pendency of U.S. application Ser. No. 14/075,034.

FIELD OF THE INVENTION

The present invention relates to driveshafts and more specifically to driveshafts for vehicle formed using a hydroforming process.

BACKGROUND OF THE INVENTION

Rotation of a driveshaft at or near a resonating frequency of the driveshaft may lead to an undesired vibration of the driveshaft. Further, rotation of a driveshaft which is unbalanced may also lead to the undesired vibration of the driveshaft, resulting in customer dissatisfaction. Rotation of the driveshaft with the undesired vibration, regardless of its source, may also lead to excessive wear of a plurality of components of the driveshaft. Center bearings, shaft end components (such as yokes), universal joint crosses, needle bearings, and a tubular portion of the driveshaft may all be excessively worn by the undesired vibration of the driveshaft.

Typically, as a length of the driveshaft increases, the resonating frequency decreases. In vehicles having long lengths of driveshaft between a vehicle powertrain and a drive axle, such as commercial trucks, the resonating frequency of the driveshaft may approach an operational speed of the driveshaft. To relieve the undesired vibration, the driveshaft may comprise a plurality of sections joined by joints. Unfortunately, adding joints to the driveshaft greatly increases a cost and a weight of the driveshaft, and thus a vehicle the driveshaft is incorporated in.

Alternately, to relieve the undesired vibration, the diameter of the driveshaft, and thus a diameter of the shaft end components, may be increased. However, increasing the diameter of the driveshaft and the diameter of the shaft end components also greatly increases the cost of the driveshaft, and thus the vehicle the driveshaft is incorporated in.

Following manufacture of the driveshaft but prior to installation of the driveshaft in the vehicle, the driveshaft is typically balanced. Through the use of a dynamic balancing machine, a mass and a location of a balancing weight on the driveshaft is determined. After application of the balancing weight, the driveshaft is substantially balanced, reducing the undesired vibration of the driveshaft during operation. However, balancing of the driveshaft increases a time of manufacture of the driveshaft and therefore increases the cost of the driveshaft, and thus the vehicle the driveshaft is incorporated in.

The driveshaft formed from aluminum reduces the weight of the driveshaft. Where formed using a hydroforming process, the driveshaft has an increased resonating frequency and a decreased manufacturing cost. Consequently, the driveshaft formed from aluminum using the hydroforming process is advantageous over the driveshaft formed from a steel using the hydroforming process. However, conventional methods used to hydroform driveshafts as applied to aluminum have been unsuccessful, as a maximum strain limit for forming aluminum is less than a maximum strain limit for forming steel.

It would be advantageous to develop a driveshaft that may be formed using a hydroforming process, reduces a cost of the driveshaft, and has an increased critical speed.

SUMMARY OF THE INVENTION

Presently provided by the invention, a driveshaft that may be formed using a hydroforming process, reduces a cost of the driveshaft, and has an increased critical speed, has surprisingly been discovered.

In one embodiment, the present invention is directed to a hydroformed driveshaft tube. The hydroformed driveshaft tube comprises a first end portion, a second end portion, and a middle portion. The middle portion is at least partially defined by a circular arc shaped surface of revolution. At least a portion of the middle portion has a diameter greater than a diameter of the first end portion and the second end portion. The middle portion comprises a first transition portion, a first constriction portion, a second constriction portion, and a second transition portion and is formed between the first constriction portion and the second constriction portion. The middle portion affects a critical speed and a breathing mode frequency of the hydroformed driveshaft tube.

Various aspects of this invention will become apparent to those skilled in the art from the following detailed description of the preferred embodiment, when read in light of the accompanying drawings.

BRIEF DESCRIPTION OF THE DRAWINGS

The above, as well as other advantages of the present invention will become readily apparent to those skilled in the art from the following detailed description when considered in the light of the accompanying drawings in which:

FIG. 1A is a perspective view of a driveshaft tube according to an embodiment of the present invention;

FIG. 1B is a side plan view of the driveshaft tube illustrated in FIG. 1A;

FIG. 2A is a perspective view of a driveshaft tube according to another embodiment of the present invention;

FIG. 2B is a side plan view of the driveshaft tube illustrated in FIG. 2A;

FIG. 3A is a perspective view of a driveshaft tube according to another embodiment of the present invention;

FIG. 3B is a side plan view of the driveshaft tube illustrated in FIG. 3A;

FIG. 4 is a table displaying experimental data collected from straight tubing used as a control, the driveshaft tube illustrated in FIG. 1A, the driveshaft tube illustrated in FIG. 2A, and the driveshaft tube illustrated in FIG. 3A;

DETAILED DESCRIPTION OF THE INVENTION

Figure 5:
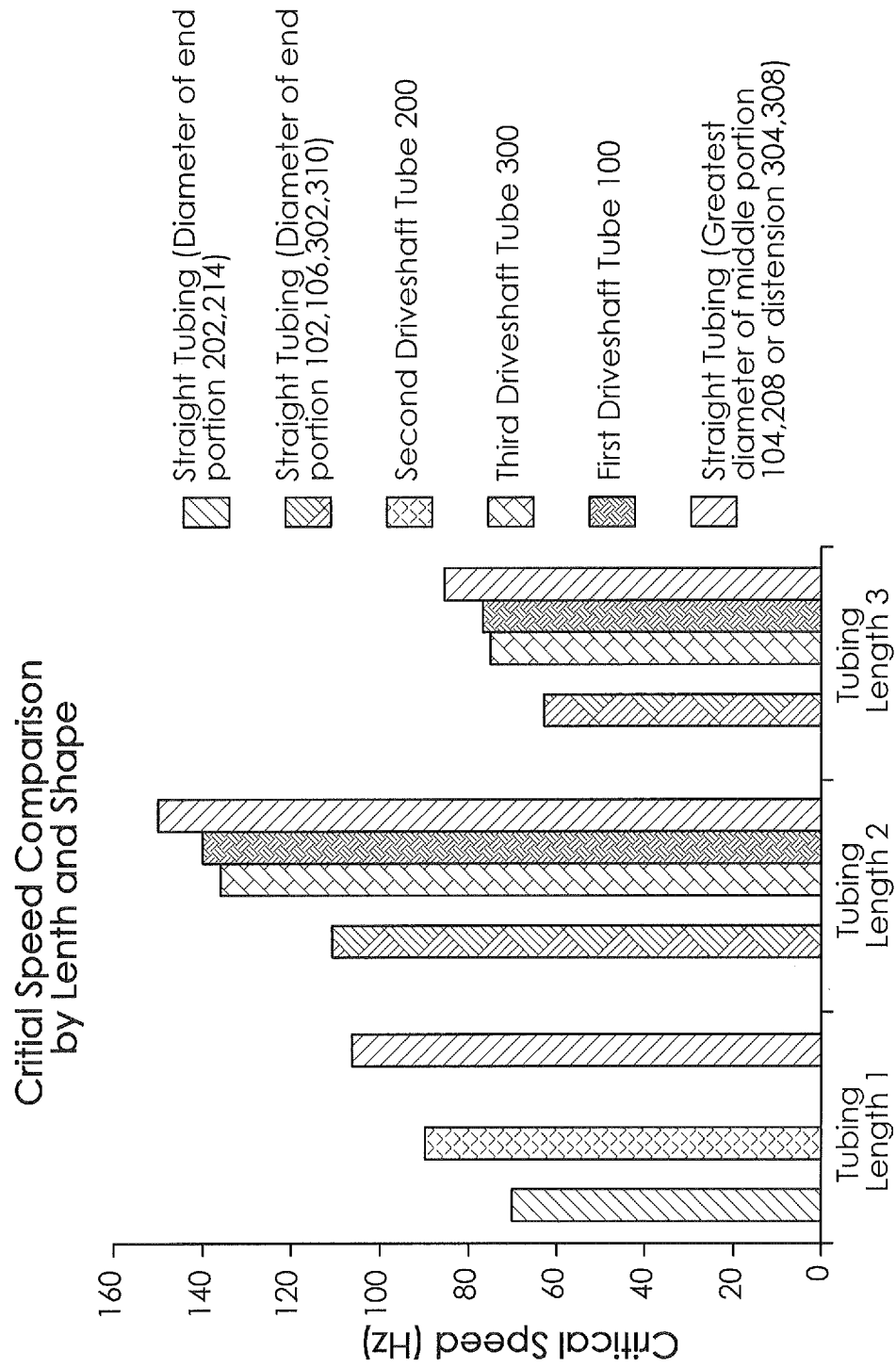
FIG. 5 is a bar style chart illustrating a portion of the experimental data shown in FIG. 4, comparing a critical speed by a length and a shape of straight tubing used as a control, the driveshaft tube illustrated in FIG. 1A, the driveshaft tube illustrated in FIG. 2A, and the driveshaft tube illustrated in FIG. 3A.

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions, directions or other physical characteristics relating to the embodiments disclosed are not to be considered as limiting, unless the claims expressly state otherwise.

FIGS. 1A and 1B illustrate a first driveshaft tube 100 formed using a hydroforming process. The first driveshaft tube 100 is formed from a 6061 aluminum alloy; however, it is understood that other alloys may be used. A tubular aluminum blank (not illustrated) used to form the first driveshaft tube 100 using the hydroforming process may be formed using an extrusion process or a seam welding process. The tubular aluminum blank is a cylindrical aluminum tube.

The first driveshaft tube 100 includes a first end portion 102, a middle portion 104, and a second end portion 106. Once fitted with a pair of shaft end components (not shown), the first driveshaft tube 100 forms a portion of a driveshaft assembly (not shown) for use with a vehicle.

The first end portion 102 and the second end portion 106 are substantially cylindrical in shape and comprise about 13% of a length of the first driveshaft tube 100, but it is understood that other ratios may also be used. A wall thickness of the first end portion 102 and the second end portion 106 are substantially constant. The first end portion 102 and the second end portion 106 respectively meet the middle portion 104 at a first tangential transition 108 and a second tangential transition 110. A radius of a substantially circular arc of a surface of revolution forming the first tangential transition 108 and the second tangential transition 110 is about four times greater than a radius of the first end portion 102 and the second end portion 106.

A shape of the middle portion 104 is a surface of revolution formed by rotating a substantially circular arc about an axis of the first end portion 102 and the second end portion 106. As a non-limiting example, the substantially circular arc of the surface of revolution of the middle portion 104 may be defined by an acute angle of about 4 degrees, but it is understood that other angle may also be used. Further, a radius of the substantially circular arc of the surface of revolution of the middle portion 104 is about 200 times greater than a radius of the first end portion 102 and the second end portion 106, but it is understood that other ratios may also be used. A wall thickness of the middle portion 104 is not constant due to the hydroforming process used to form the first driveshaft tube 100. A thickness of the middle portion 104 at a thinnest point, at a midpoint of the first driveshaft tube 100, is about 90% of a thickness of the first end portion 102 and the second end portion 106, but it is understood that other ratios may be used. The shape of the middle portion 104 of the first driveshaft tube 100 may be commonly described as a barrel shape.

The first driveshaft tube 100 increases a critical speed or a first bending mode of the driveshaft having a first length by an average of approximately 26% when compared to straight tubing used as a control, the straight tubing having an outer diameter substantially equal to the diameter of the end portions 102, 106. The first driveshaft tube 100 increases a critical speed or a first bending mode of the driveshaft having a second length by an average of approximately 23% when compared to straight tubing used as a control, the straight tubing having an outer diameter substantially equal to the diameter of the end portions 102, 106. The critical speed of the first driveshaft tube 100 is highly dependent on the average diameter of the tubing, so with adjustments to the shape of the forming and percentage of straight tubing forming the first driveshaft tube 100, this increase in critical speed can be adjusted.

It has also been discovered through experimentation that a breathing mode frequency of the first driveshaft tube 100 is significantly increased when compared to straight tubing used as a control, the straight tubing having an outer diameter substantially equal to a greatest diameter of the middle portion 104. The first driveshaft tube 100 having a first length offers an increase over the straight tubing used as a control of about 67%. The first driveshaft tube 100 having a second length offers an increase over the straight tubing used as a control of about 72%. Breathing modes are natural modes of tubing where the circumference of the tube is bent to a non-perfect circle. As this occurs it acts as an amplifying agent to any other noises in the vehicle, typically a whine of a transmission or an axle gear.

FIGS. 2A and 2B illustrate a second driveshaft tube 200 formed using a hydroforming process. The second driveshaft tube 200 is formed from a 6061 aluminum alloy; however, it is understood that other alloys may be used. A tubular aluminum blank (not illustrated) used to form the second driveshaft tube 200 using the hydroforming process may be formed using an extrusion process or a seam welding process. The tubular aluminum blank is a cylindrical aluminum tube.

The second driveshaft tube 200 includes a first end portion 202, a first transition portion 204, a first constriction portion 206, a middle portion 208, a second constriction portion 210, a second transition portion 212, and a second end portion 214. Once fitted with a pair of shaft end components (not shown), the second driveshaft tube 200 forms a portion of a driveshaft assembly (not shown) for use with a vehicle.

The first end portion 202 and the second end portion 214 are substantially cylindrical in shape and each comprise about 11% of a length of the second driveshaft tube 200, but it is understood that other ratios may be used. A wall thickness of the first end portion 202 and the second end portion 214 are substantially constant. The first end portion 202 and the second end portion 214 respectively meet the first transition portion 204 and the second transition portion 212 in a first tangential transition 216 and a second tangential transition 218. A radius of a substantially circular arc of a surface of revolution forming the first tangential transition 216 and the second tangential transition 218 is about 4.5 times greater than a radius of the first end portion 202 and the second end portion 214.

A shape of the first transition portion 204, the middle portion 208, and the second transition portion 212 corresponds in shape to a surface of revolution formed by rotating a substantially circular arc, C1, shown in FIG. 2B, about an axis of the first end portion 204 and the second end portion 214. The first transition portion 204 and the second transition 212 portion each comprise about 11% of a length of the second driveshaft tube 200, but it is understood that other ratios may be used. The middle portion 208 comprises about 40% of a length of the second driveshaft tube 200, but it is understood that other ratios may be used. As a non-limiting example, the substantially circular arc, C1, shown in FIG.

2B, of the surface of revolution corresponding in shape to the first transition portion 204, the middle portion 208, and the second transition portion 212 may be defined by an acute angle of about 7 degrees, but it is understood that other angles may be used. Further, a radius, Ra, shown in FIG. 2B, of the substantially circular arc of the surface of revolution corresponding in shape to the first transition portion 204, the middle portion 208, and the second transition portion 212 is about 150 times greater than a radius, Rb, shown in FIG. 2A, of the first end portion 202 and the second end portion 214, but it is understood that other ratios may be used. A wall thickness of the middle portion 208 is not constant due to the hydroforming process used to form the second driveshaft tube 200. A thickness of the middle portion 208 at a thinnest point, at a midpoint of the middle portion 208, is about 90% of a thickness of the first end portion 202 and the second end portion 214, but it is understood that other ratios may be used. The shape of the first transition portion 204, the middle portion 208, and the second transition portion 212 is divided by the first constriction portion 206 and the second constriction portion 210.

The first constriction portion 206 and the second constriction portion 210 are each a surface of revolution formed by rotating a substantially circular arc, C2, shown in FIG. 2B, about an axis of the first end portion 202 and the second end portion 214. As a non-limiting example, the substantially circular arc, C2, shown in FIG. 2B, of the surface of revolution of the first constriction portion 206 and the second constriction portion 210 may each be defined by an acute angle of about 20 degrees, but it is understood that other angles may be used. Further, a radius of the substantially circular arc, C2, shown in FIG. 2B, of the surface of revolution of the first constriction portion 206 and the second constriction portion 210 is about 4.5 times greater than a radius of the first end portion 202 and the second end portion 214, but it is understood that other ratios may be used. A concavity of the arc C2, shown in FIG. 2B, of the first constriction portion 206 and the second constriction portion 210 is opposite a concavity of the arc C1, shown in FIG. 2B, of the first transition portion 204, the middle portion 208, and the second transition portion 212. A wall thickness of the first constriction portion 206 and the second constriction portion 210 are substantially equal to a thickness of the first end portion 202 and the second end portion 214. A diameter of the first constriction portion 206 and the second constriction portion 210 is about 16% greater than a diameter of the first end portion 202 and the second end portion 214. The first constriction portion 206 respectively tangentially meets the first transition portion 204 and the middle portion 208 in a third tangential transition 220 and a fourth tangential transition 222. A radius of a substantially circular arc of a surface of revolution forming the third tangential transition 220 and the fourth tangential transition 222 is about 4.5 times greater than a radius of the first end portion 202 and the second end portion 214. The second constriction portion 210 respectively tangentially meets the second transition portion 212 and the middle portion 208 in a fifth tangential transition 224 and a sixth tangential transition 226. A radius of a substantially circular arc of a surface of revolution forming the fifth tangential transition 224 and the sixth tangential transition 226 is about 4.5 times greater than a radius of the first end portion 202 and the second end portion 214.

The first constriction portion 206 and the second constriction portion 210 of the second driveshaft tube 200 respectively provide a tertiary datum 226 and a quaternary datum 228 (in addition to the first end portion 202 and the second end portion 214) to militate against tube buckling which may occur during the hydroforming process. As a result, the first constriction portion 206 and the second constriction portion 210 of the second driveshaft tube 200 reduce an amount of axial runout that is generated in the second driveshaft tube 200 during the hydroforming process. The first constriction portion 206 and the second constriction portion 210 of the second driveshaft tube 200 are created by a shape of a hydroforming die. The diameter of the second driveshaft tube 200 at the first constriction portion 206 and the second constriction portion 210 is greater than the diameter of the first end portion 202 and the second end portion 214, which allow the hydroforming die to secure the second driveshaft tube 200 with respect to the first end portion 202 and the second end portion 214 during the hydroforming process.

The second driveshaft tube 200 increases a critical speed or a first bending mode of the driveshaft having a first length by an average of approximately 29% when compared to straight tubing used as a control, the straight tubing having an outer diameter substantially equal to the diameter of the end portions 202, 214. The critical speed of the second driveshaft tube 200 is highly dependent on the average diameter of the tubing, so with adjustments to the shape of the forming and percentage of straight tubing forming the second driveshaft tube 200, this increase in critical speed can be adjusted.

It has also been discovered through experimentation that a breathing mode frequency of the second driveshaft tube 200 is significantly increased when compared to straight tubing used as a control, the straight tubing having an outer diameter substantially equal to a greatest diameter of the middle portion 208. The second driveshaft tube 200 having a first length offers an increase over the straight tubing used as a control of about 52%.

FIGS. 3A and 3B illustrate a third driveshaft tube 300 formed using a hydroforming process. The third driveshaft tube 300 is formed from a 6061 aluminum alloy; however, it is understood that other alloys may be used. A tubular aluminum blank (not illustrated) used to form the third driveshaft tube 300 using the hydroforming process may be formed using an extrusion process or a seam welding process. The tubular aluminum blank is a cylindrical aluminum tube.

The third driveshaft tube 300 includes a first end portion 302, a first distension 304, a constriction 306, a second distension 308, and a second end portion 310. Once fitted with a pair of shaft end components (not shown), the third driveshaft tube 300 forms a portion of a driveshaft assembly (not shown) for use with a vehicle.

The first end portion 302 and the second end portion 310 are substantially cylindrical in shape and each comprise about 7% of a length of the third driveshaft tube 300, but it is understood that other ratios may be used. A wall thickness of the first end portion 302 and the second end portion 310 are substantially constant. The first end portion 302 and the second end portion 310 respectively meets the first distension 304 and the second distension 308 at a first tangential transition 312 and a second tangential transition 314. A radius of a substantially circular arc of a surface of revolution forming the first tangential transition 312 and the second tangential transition 314 is about four times greater than a radius of the first end portion 302 and the second end portion 310.

A shape of the first distension 304 is a surface of revolution formed by rotating a substantially circular arc about an axis of the first end portion 302 and the second end portion 310. As a non-limiting example, the substantially circular arc of the surface of revolution of the first distension 304 may be defined by an acute angle of about 10 degrees, but it is understood that other angles may be used. Further, a radius of the substantially circular arc of the surface of revolution of the first distension 304 is about 40 times greater than a radius of the first end portion 302 and the second end portion 310, but it is understood that other ratios may be used. A wall thickness of the first distension 304 is not constant due to the hydroforming process used to form the third driveshaft tube 300. A thickness of the first distension 304 at a thinnest point, at a midpoint of the first distension 304, is about 90% of a thickness of the first end portion 302 and the second end portion 310, but it is understood that other ratios may be used. The shape of the first distension 304 of the third driveshaft tube 300 may be commonly described as a barrel shape.

The constriction 306 is a surface of revolution formed by rotating a substantially circular arc about an axis of the first end portion 302 and the second end portion 310. As a non-limiting example, the substantially circular arc of the surface of revolution of the constriction 306 may be defined by an acute angle of about 6 degrees, but it is understood that other angles may be used. Further, a radius of the substantially circular arc of the surface of revolution of the constriction 306 is about four times greater than a radius of the first end portion 302 and the second end portion 310, but it is understood that other ratios may be used. A concavity of the constriction 306 is opposite a concavity of the first distension 304 and the second distension 308. A wall thickness and a diameter of the constriction 306 are substantially equal to a thickness and a diameter of the first end portion 302 and the second end portion 310. The constriction 306 respectively meets the first distension 304 and the second distension 308 at a third tangential transition 316 and a fourth tangential transition 318. A radius of a substantially circular arc of a surface of revolution forming each of the third tangential transition 316 and the fourth tangential transition 318 is about 4 times greater than a radius of the first end portion 302 and the second end portion 310.

A shape of the second distension 308 is a surface of revolution formed by rotating a substantially circular arc about an axis of the first end portion 302 and the second end portion 310. As a non-limiting example, the substantially circular arc of the surface of revolution of the second distension 308 may be defined by an acute angle of about 10 degrees, but it is understood that other angles may be used. Further, a radius of the substantially circular arc of the surface of revolution of the second distension 308 is about 40 times greater than a radius of the first end portion 302 and the second end portion 310, but it is understood that other ratios may be used. A wall thickness of the second distension 308 is not constant due to the hydroforming process used to form the third driveshaft tube 300. A thickness of the second distension 308 at a thinnest point, at a midpoint of the second distension 308, is about 90% of a thickness of the first end portion 302 and the second end portion 310, but it is understood that other ratios may be used. The shape of the second distension 308 of the third driveshaft tube 300 may be commonly described as a barrel shape.

The constriction 306 of the third driveshaft tube 300 provides a tertiary datum 320 (in addition to the first end portion 302 and the second end portion 310) to militate against tube buckling which may occur during the hydroforming process. As a result, the constriction 306 of the third driveshaft tube 300 reduces an amount of axial runout that is generated in the third driveshaft tube 300 during the hydroforming process. The constriction 306 of the third driveshaft tube 300 is created by a shape of a hydroforming die. The diameter of the third driveshaft tube 300 at the constriction 306 is the same diameter as the first end portion 302 and the second end portion 310, which allows the hydroforming die to secure a center of the third driveshaft tube 300 with respect to the first end portion 302 and the second end portion 310 during the hydroforming process.

The third driveshaft tube 300 increases a critical speed or a first bending mode of the driveshaft having a first length by an average of approximately 22% when compared to straight tubing used as a control, the straight tubing having an outer diameter substantially equal to the diameter of the end portions 302, 310. The third driveshaft tube 300 also increases a critical speed or a first bending mode of the driveshaft having a second length by an average of approximately 20% when compared to straight tubing used as a control, the straight tubing having an outer diameter substantially equal to the diameter of the end portions 302, 310. The critical speed of the third driveshaft tube 300 is highly dependent on the average diameter of the tubing, so with adjustments to the shape of the forming and percentage of straight tubing forming the third driveshaft tube 300, this increase in critical speed can be adjusted.

It has also been discovered through experimentation that a breathing mode frequency of the third driveshaft tube 300 is significantly increased when compared to straight tubing used as a control, the straight tubing having an outer diameter substantially equal to a greatest diameter of the distensions 304, 308. The third driveshaft tube 300 having a first length offers an increase over the straight tubing used as a control of about 105%. The third driveshaft tube 300 having a second length offers an increase over the straight tubing used as a control of about 112%.

FIG. 4 is a table which includes experimental data collected from straight tubing used as a control, the first driveshaft tube 100, the second driveshaft tube 200, and the third driveshaft tube 300. The aforementioned results are shown and based upon the experimental data shown in FIG. 4.

FIG. 5 is a bar style chart comparing the critical speed by a length and a shape of straight tubing used as a control (in three instances), the first driveshaft tube 100, the second driveshaft tube 200, and the third driveshaft tube 300. The bar style chart display the experimental data shown in FIG. 4.

Figure 6:
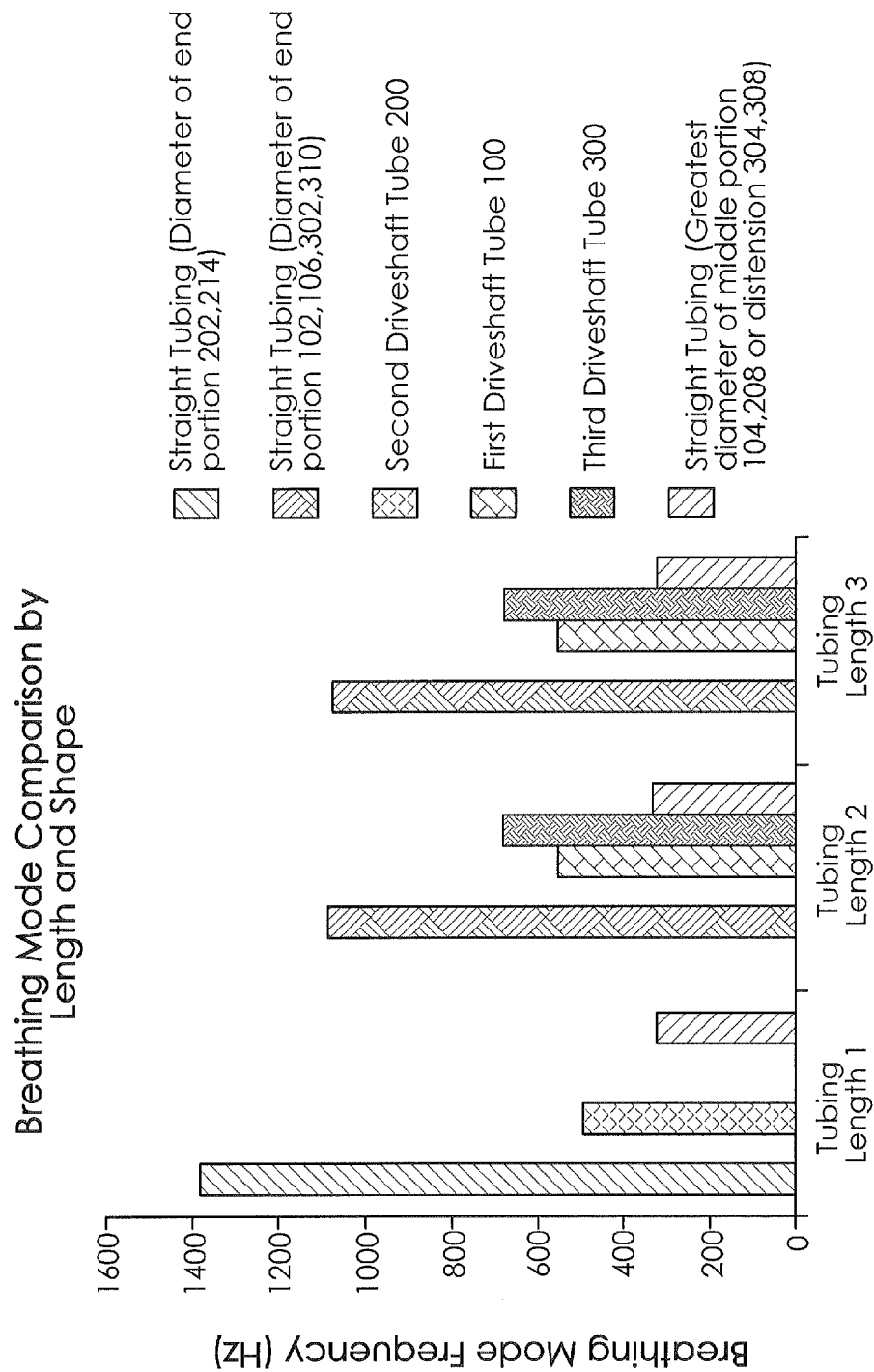
FIG. 6 is a bar style chart illustrating a portion of the experimental data shown in FIG. 4, comparing a breathing mode frequency by a length and a shape of straight tubing used as a control, the driveshaft tube illustrated in FIG. 1A, the driveshaft tube illustrated in FIG. 2A, and the driveshaft tube illustrated in FIG. 3A.

FIG. 6 is a bar style chart comparing the breathing mode by a length and a shape of straight tubing used as a control (in three instances), the first driveshaft tube 100, the second driveshaft tube 200, and the third driveshaft tube 300. The bar style chart display the experimental data shown in FIG. 4.

As can be appreciated from FIGS. 4-6, the driveshaft tube 100, 200, 300 has an increased critical speed when compared to straight tubing used as a control, the straight tubing having an outer diameter substantially equal to the diameter of the end portions 102, 106, 202, 214, 302, 310. Such a benefit allows the driveshaft assembly including the driveshaft tube 100, 200, 300 to have critical speed characteristics of a driveshaft tube having a greater diameter than a driveshaft formed from straight tubing having an outer diameter substantially equal to the diameter of the end portions 102, 106, 202, 214, 302, 310. The driveshaft assembly including the driveshaft tube 100, 200, 300 is compatible with driveshaft end fittings having a reduced diameter, which greatly reduces a cost of the driveshaft assembly including the driveshaft tube 100, 200, 300.

As can be appreciated from FIGS. 4-6, the driveshaft tube 100, 200, 300 has an increased breathing mode frequency when compared to straight tubing used as a control, the straight tubing having an outer diameter substantially equal to a greatest diameter of the middle portion 104, 208 or the distensions 304, 308. Such a benefit allows the driveshaft assembly including the driveshaft tube 100, 200, 300 to have breathing mode frequency characteristics of a driveshaft tube having a reduced diameter, while still obtaining the critical speed benefits of a driveshaft tube having an increased diameter.

In accordance with the provisions of the patent statutes, the present invention has been described in what is considered to represent its preferred embodiments. However, it should be noted that the invention can be practiced otherwise than as specifically illustrated and described without departing from its spirit or scope.

What is claimed is:

1. A hydroformed driveshaft tube, comprising:
   a first end portion;
   a second end portion; and
   a middle portion at least partially defined by a circular arc shaped surface of revolution having a radius about 150 times greater than a radius of the first end portion and the second end portion and at least a portion of the middle portion having a diameter greater than a diameter of the first end portion and the second end portion, the middle portion comprising a first transition portion, a first constriction portion, a second constriction portion, and a second transition portion, wherein the middle portion is formed between the first constriction portion and the second constriction portion.

2. The hydroformed driveshaft tube according to claim 1, wherein the circular arc shaped surface of revolution corresponds in shape to the first transition portion, the middle portion, and the second transition portion.

3. The hydroformed driveshaft tube according to claim 1, wherein a concavity of the first constriction and the second constriction is opposite a concavity of the first transition portion, the middle portion, and the second transition portion.

4. The hydroformed driveshaft tube according to claim 1, wherein the first constriction and the second constriction each provide a datum to militate against tube buckling which may occur during a hydroforming process used to form the hydroformed driveshaft tube.

5. The hydroformed driveshaft tube according to claim 1, wherein a diameter of the first constriction and the second constriction is greater than the diameter of the first end portion and the second end portion.

6. A hydroformed driveshaft tube, comprising:
   a first end portion having a substantially cylindrical shape;
   a second end portion having a substantially cylindrical shape; and
   a middle portion comprising a first transition portion, a first constriction portion, a second constriction portion, and a second transition portion, the middle portion at least partially defined by a circular arc shaped surface of revolution corresponding in shape to the first transition portion, the middle portion, and the second transition portion, at least a portion of the middle portion having a diameter greater than a diameter of the first end portion and the second end portion, the first transition portion, the middle portion, and the second transition portion having a first concavity,
   the first transition portion formed between the first end portion and the first constriction portion;
   the first constriction portion defined by a circular arc shaped surface of revolution and having a second concavity, the first constriction having a diameter greater than the diameter of the first end portion;
   the second constriction portion defined by a circular arc shaped surface of revolution and having the second concavity, the second constriction having a diameter greater than the diameter of the second end portion;
   the second transition portion formed between the second end portion and the second constriction portion, wherein the first concavity is opposite a concavity of the second concavity, the first constriction and the second constriction each provide a datum to militate against tube buckling which may occur during a hydroforming process used to form the hydroformed driveshaft tube.

* * * * *